(12) United States Patent
Izawa et al.

(10) Patent No.: US 9,772,511 B2
(45) Date of Patent: Sep. 26, 2017

(54) EYEGLASS LENS AND EYEGLASS LENS MANUFACTURING METHOD

(71) Applicant: Hoya Lens Thailand Ltd., Thanyaburi, Pathumthani (TH)

(72) Inventors: Yasunori Izawa, Tokyo (JP); Tomohiro Odaira, Tokyo (JP)

(73) Assignee: HOYA LENS THAILAND LTD., Thanyaburi (TH)

( * ) Notice: Subject to any disclaimer, the term of this patent is extended or adjusted under 35 U.S.C. 154(b) by 0 days.

(21) Appl. No.: 15/023,482

(22) PCT Filed: Sep. 19, 2014

(86) PCT No.: PCT/JP2014/074885
§ 371 (c)(1),
(2) Date: Mar. 21, 2016

(87) PCT Pub. No.: WO2015/041327
PCT Pub. Date: Mar. 26, 2015

(65) Prior Publication Data
US 2016/0209677 A1    Jul. 21, 2016

(30) Foreign Application Priority Data

Sep. 20, 2013  (JP) ................. 2013-195369

(51) Int. Cl.
*G02C 7/02*    (2006.01)
*G02C 7/06*    (2006.01)

(52) U.S. Cl.
CPC ............. *G02C 7/065* (2013.01); *G02C 7/024* (2013.01); *G02C 7/028* (2013.01); *G02C 7/061* (2013.01);
(Continued)

(58) Field of Classification Search
CPC .......... G02C 7/02; G02C 7/024; G02C 7/025; G02C 7/027; G02C 7/028
(Continued)

(56) References Cited

U.S. PATENT DOCUMENTS 5,557,348 A    9/1996  Umeda et al.
5,892,565 A    4/1999  Ueno et al.
(Continued)

FOREIGN PATENT DOCUMENTS

EP    0632308 A1    1/1995
ES    2312273 A1    2/2009
(Continued)

OTHER PUBLICATIONS

Aug. 16, 2016 Office Action issued in Australian Patent Application No. 2014322055.
(Continued)

*Primary Examiner* — Darryl J Collins
(74) *Attorney, Agent, or Firm* — Oliff PLC

(57) ABSTRACT

A spectacle lens is provided belonging to a series of spectacle lenses having each of first refractive power and second refractive power in common, where a progressive region length, which is a length along a meridian within a progressive region, is shorter than a predetermined reference spectacle lens belonging to the series of spectacle lenses, and a designed maximum differential value where a normalized addition refractive power distribution in the progressive region is differentiated is caused to be close to a reference maximum differential value where a normalized addition refractive power distribution in the progressive region of the reference spectacle lens is differentiated.

12 Claims, 10 Drawing Sheets

(52) U.S. Cl.
CPC ............ *G02C 7/063* (2013.01); *G02C 7/066* (2013.01); *G02C 2202/08* (2013.01)

(58) Field of Classification Search
USPC ............ 351/159.01, 159.41, 159.42, 159.73, 351/159.75, 159.76
See application file for complete search history.

(56) References Cited

U.S. PATENT DOCUMENTS

| | | | |
|---|---|---|---|
| 2002/0171803 A1 | 11/2002 | Ahsbahs et al. | |
| 2010/0045931 A1* | 2/2010 | Gerligand | G02C 7/028 351/159.42 |

FOREIGN PATENT DOCUMENTS

| | | |
|---|---|---|
| JP | 2005-084269 A | 3/2005 |
| JP | 2008-065358 A | 3/2008 |

OTHER PUBLICATIONS

Mar. 22, 2016 International Preliminary Report on Patentability issued in International Patent Application No. PCT/JP2014/074885.

"Glasses Science Handbook," edited by Glasses Science Handbook Editing Committee in the Japanese Society of Glasses Science, published by Gankyo Publishing Co., Ltd., Mar. 30, 2012, 3rd Ed., p. 137, Table 4-1, "Classification of progressive lens."

Dec. 16, 2014 International Search Report issued in International Patent Application No. PCT/JP2014/074885.

Mar. 22, 2017 Extended Search Report issued in European Patent Application No. 14846307.8.

Apr. 3, 2017 Office Action issued in Japanese Patent Application No. 2015-537981.

Apr. 18, 2017 Office Action issued in Chinese Application No. 201480051676.1.

* cited by examiner

*FIG. 6A*  EXAMPLE OF EXISTING DESIGN 1 (23.5 mm)
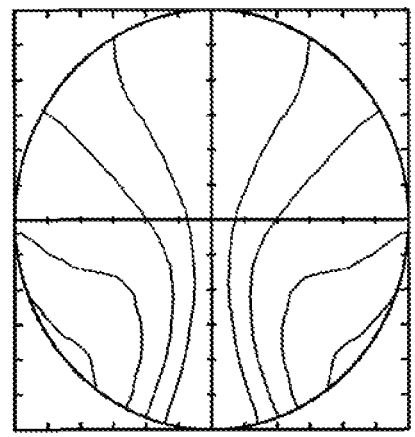
*FIG. 6B*  EXAMPLE OF EXISTING DESIGN 2 (18 mm)
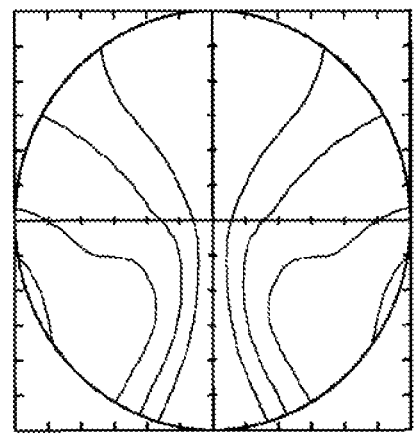
*FIG. 6C*  EXAMPLE 1 (18 mm: INTERMEDIATE VISION PRIORITIZED)
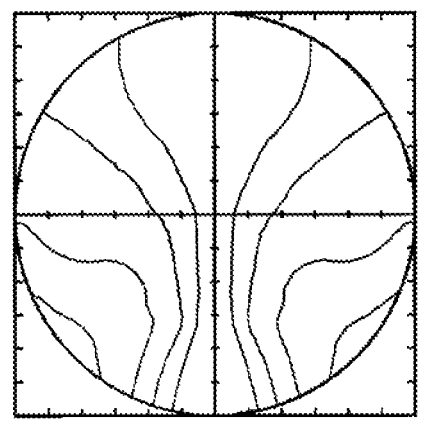

EXAMPLE 1
(18 mm: INTERMEDIATE
VISION PRIORITIZED)

EXAMPLE 2
(18 mm: DISTANCE
VISION PRIORITIZED)

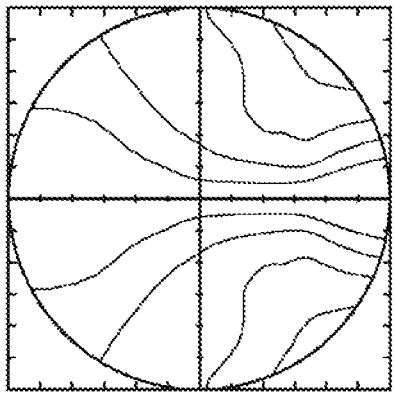
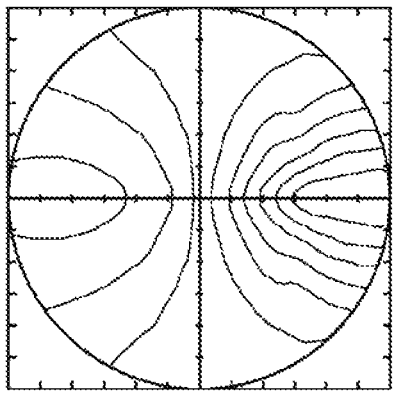
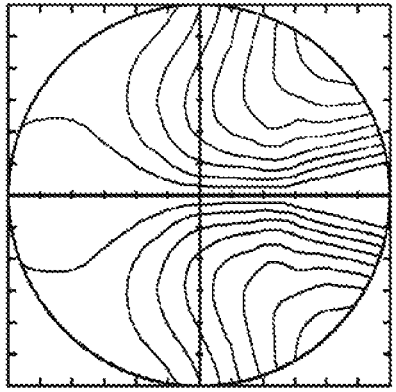
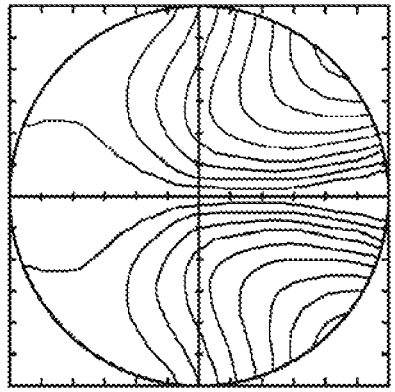
FIG. 10A ASTIGMATISM DISTRIBUTION
FIG. 10B AVERAGE DIOPTER ERROR DISTRIBUTION
FIG. 10C RMS DISTRIBUTION
EXAMPLE 1 (18 mm: INTERMEDIATE VISION PRIORITIZED)
EXEMPLARY VARIATION OF EXAMPLE 1

EYEGLASS LENS AND EYEGLASS LENS MANUFACTURING METHOD

TECHNICAL FIELD

The present invention relates to a spectacle lens including a region having progressively changing refractive power and a method for producing the spectacle lens.

BACKGROUND ART

When designing a spectacle lens including a region having progressively changing refractive power such as a progressive region, a meridian (principal vision line) where movement of an eye of a spectacle wearer from distance vision to near vision is assumed is defined on the lens and then an area of clear vision is set based on the defined meridian. Note that the area of clear vision is a region with less warping and blurs of images where astigmatism of transmission performance is suppressed to a certain value or less.

When designing a spectacle lens of such a type, it is practically impossible to secure a wide range of the area of clear vision over an entire area from a distance portion to a near portion in a uniform manner. For example, in a progressive region between the distance portion and near portion, a width of the area of clear vision (width in the horizontal direction) is narrowed as compared to that in the distance portion or near portion as a side effect of progressive variation in refractive power.

A general distance-near vision lens having progressive refractive power places more priority on distance vision and thus a distance portion is designed to be large, thereby resulting in a short progressive region. In this manner, the distance-near vision lens having progressive refractive power has a short progressive region length (length along a meridian within the progressive region). Therefore, refractive power is designed to change with a steep gradient from the distance portion to near portion.

Generally, the steeper the refractive power change is in the progressive region, the narrower a width of the area of clear vision is in the progressive region. Therefore, the distance-near vision lens having progressive refractive power has a narrow width of the area of clear vision in the progressive region. For example, when a spectacle wearer of the distance-near vision lens having progressive refractive power moves the eyes at a relatively fast speed by nodding or shaking the head up and down or to left and right, the spectacle wearer may feel strong uncomfortablesness after perceiving warping of images due to aberration in the progressive region as shaking (especially a side part in the progressive region). Therefore, the distance-near vision lens having progressive refractive power is not suitable for a spectacle wearer who uses the progressive region frequently.

Meanwhile, an intermediate-near vision lens with more focus on intermediate vision is known (e.g. JP 2008-65358 A). In the intermediate-near vision lens, as compared to the distance-near vision lens having progressive refractive power, a progressive region is designed to be longer and to extend in art upper side of the lens, thus allowing for refractive power in the progressive region to change gradually. This allows for suppressing aberration in a side part of the progressive region while simultaneously ensuring a wide width of the area of clear vision in the progressive region. This reduces warping and blurs of images in the progressive region and thus achieves superior performance for indoor use where intermediate vision and near vision are mainly used.

SUMMARY OF INVENTION

In this manner, an intermediate-near vision lens has a long progressive region length as compared to a distance-near vision lens having progressive refractive power. Therefore, a spectacle wearer has to move the eyes downward more than when wearing the distance-near vision lens having progressive refractive power in order to change a visual distance. Moreover, a spectacle wearer who wears a spectacle lens of this type (intermediate-near vision lens or distance-near vision lens having progressive refractive power) for the first time is not familiar with downward movement of the eyeballs. Further, the intermediate-near vision lens has a long progressive region length and thus is not suitable for a frame with a narrow vertical width.

From the above circumstances, the present inventors have gained a finding that there is a strong demand for a type of spectacle lens that corresponds to a visual distance of a spectacle wearer (distance-near vision lens having progressive refractive power, intermediate-near vision lens, or the like) which satisfies a prescribed power while a progressive region length is designed to be further shorter. However, designing the progressive region to be simply shorter results in a steep gradient of addition refractive power and thus a width of the area of clear vision in the progressive region becomes short. As a result, disadvantage of strong warping or blurs of images cannot be avoided. That is, a spectacle lens with a short progressive region length results in less optical performance in the progressive region as compared to a spectacle lens with a longer progressive region length having the same prescribed value. Thus, an equivalent optical performance to the spectacle lens having a longer progressive region length cannot be achieved. Therefore, the progressive region cannot be simply designed to be short.

The present invention has been devised in consideration to the above circumstances, and an object thereof is to provide a spectacle lens suitable for designing a short progressive region length in respective spectacle lens types such as a distance-near vision lens having progressive refractive power or an intermediate-near vision lens and a method for producing the spectacle lens.

A spectacle lens according to an embodiment of the present invention includes a first refraction region having first refractive power, a second refraction region having second refractive power larger than the first refractive power, and a progressive region having progressively changing refractive power along a meridian from the first refraction region to the second refraction region, where the spectacle lens belongs to a series of spectacle lenses having each of the first refractive power and the second refractive power in common. The spectacle lens of the present embodiment has a shorter progressive region length, which is a length along the meridian within the progressive region, than a predetermined reference spectacle lens belonging to a series of spectacle lenses. Moreover, a designed maximum differential value where a normalized addition refractive power distribution in the progressive region of the spectacle lens is differentiated is caused to be close to a reference maximum differential value where a normalized addition refractive lower distribution in the progressive region of the reference spectacle lens is differentiated.

In the present embodiment, the spectacle lens is designed to have the maximum differential value closer to the reference maximum differential value and thus, at least in a partial section in the progressive region, the spectacle lens may have the normalized addition refractive power distribution which is identical or close to the normalized addition refractive power distribution of the reference spectacle lens.

In the present embodiment, the spectacle lens, at least in a partial section in the progressive region, may have a differential value of the normalized addition refractive power distribution in the progressive region smaller than or equal to the reference maximum differential value.

In the present embodiment, the spectacle lens, in a predetermined section in the progressive region that is common to that of the reference spectacle lens, may have an average value of differential values of the normalized addition refractive power distribution substantially equal to that of the reference spectacle lens.

For example, when the progressive region is classified into a highly-frequent used section corresponding to a visual distance high frequently used and a less-frequent used section corresponding to another visual distance less frequently used than the visual distance corresponding to the highly-frequent used section, the predetermined section in the progressive region that is common to that of the reference spectacle lens is the highly-frequent used section.

In the present embodiment, the spectacle lens may have refractive power progressively added up to a predetermined range beyond a boundary between the progressive region and the second refraction region.

In the present embodiment, the spectacle lens may have a normalized addition refractive power distribution which does not substantially decrease when passing the boundary between the progressive region and the second refraction region and does not substantially decrease until near an ending point of the predetermined range.

In the present embodiment, the spectacle lens may have a second order differential value of the normalized addition refractive power distribution that is kept to be suppressed since refractive power is progressively added up to the predetermined range beyond the boundary between the progressive region and the second refraction region.

In the present embodiment, the spectacle lens may have controlled changes of curvature in the horizontal direction in the lens and thus allow changes of curvature in the horizontal direction in the lens due to refractive power progressively added up to the predetermined range beyond the boundary between the progressive region and the second refraction region to be suppressed.

A method of producing a spectacle lens according to an embodiment of the present invention includes a method for producing a spectacle liens including a first refraction region having first refractive power, a second refraction region having second refractive power larger than the first refractive power, and a progressive region having progressively changing refractive power along a meridian from the first refraction region to the second refraction region, where the spectacle lens belongs to a series of spectacle lenses having each of the first refractive rower and the second refractive power in common. The method of producing the spectacle lens of the present embodiment includes setting a progressive region length, which is a length along the meridian within the progressive region, to be shorter than a predetermined reference spectacle lens belonging to the series of spectacle lenses, designing a designed maximum differential value where a normalized addition refractive power distribution in the progressive region is differentiated to be close to a reference maximum differential value where a normalized addition refractive power distribution in the progressive region of the reference spectacle lens is differentiated, and producing the spectacle lens having been designed.

A method of producing the spectacle lens according to an embodiment of the present invention includes a method for producing a spectacle lens including a first refraction region having first refractive power, a second refraction region having second refractive power larger than the first refractive power, and a progressive region having progressively changing refractive power along a meridian from the first refraction region to the second refraction region. The method of producing the spectacle lens of the present embodiment includes, where, from among a plurality of types of spectacle lens having each of the first refractive power and the second refractive power in common, the spectacle lens having a first progressive region length along the meridian within the progressive region is defined as a reference spectacle lens and the spectacle lens having a second progressive region length shorter than the first progressive region length is defined as a designed spectacle lens, designing a designed maximum differential value where a normalized addition refractive power distribution in the progressive region of the designed spectacle lens is differentiated to be close to a reference maximum differential value where a normalized addition refractive power distribution in a progressive region of the reference spectacle lens is differentiated, and producing the designed spectacle lens having been designed.

A spectacle lens according to an embodiment of the present invention includes a first refraction region having first refractive power, a second refraction region having second refractive power larger than the first refractive power, and a progressive region having progressively changing refractive power along a meridian from the first refraction region to the second refraction region, where the spectacle lens belongs to a series of spectacle lenses having each of the first refractive power and the second refractive power in common. The spectacle lens of the present embodiment has a shorter progressive region length, which is a length along the meridian within the progressive region, than a predetermined reference spectacle lens belonging to a series of spectacle lenses and has, in a predetermined section in the progressive region that is common to that of the reference spectacle lens, an average value, of differential values of the normalized addition refractive power distribution, substantially equal to that of the reference spectacle lens.

Note that, for example, from among spectacle lenses belonging to a series of spectacle lenses, any spectacle lens having a progressive region length longer than the spectacle lens of the preset embodiment can be employed a the reference spectacle lens. As an example, a case is assumed where there are four types of spectacle lenses belonging to a series of spectacle lenses and the spectacle lens having the shortest progressive region length of all is the spectacle lens of the present embodiment. In this case, any type (of the three types) having the progressive region length longer than the spectacle lens of the present embodiment may be employed as the reference spectacle lens.

The present embodiment provides a spectacle lens suitable for designing a short progressive region in respective spectacle lens types such as a distance-near vision lens having progressive refractive power or an intermediate-near vision lens and a method for producing the spectacle lens.

BRIEF DESCRIPTION OF DRAWINGS

FIG. 6 includes diagrams illustrating root mean square (RMS) distributions of the respective examples.

FIG. 10 includes diagrams illustrating astigmatism distributions (FIG. 10A), average power error distributions (FIG. 10B), and RMS distributions (FIG. 10C) of the respective examples.

DESCRIPTION OF EMBODIMENTS

A production system of spectacle lenses according to an embodiment of the present invention will be described below with reference to the drawings.

[Production System of Spectacle Lenses 1]

Figure 1:
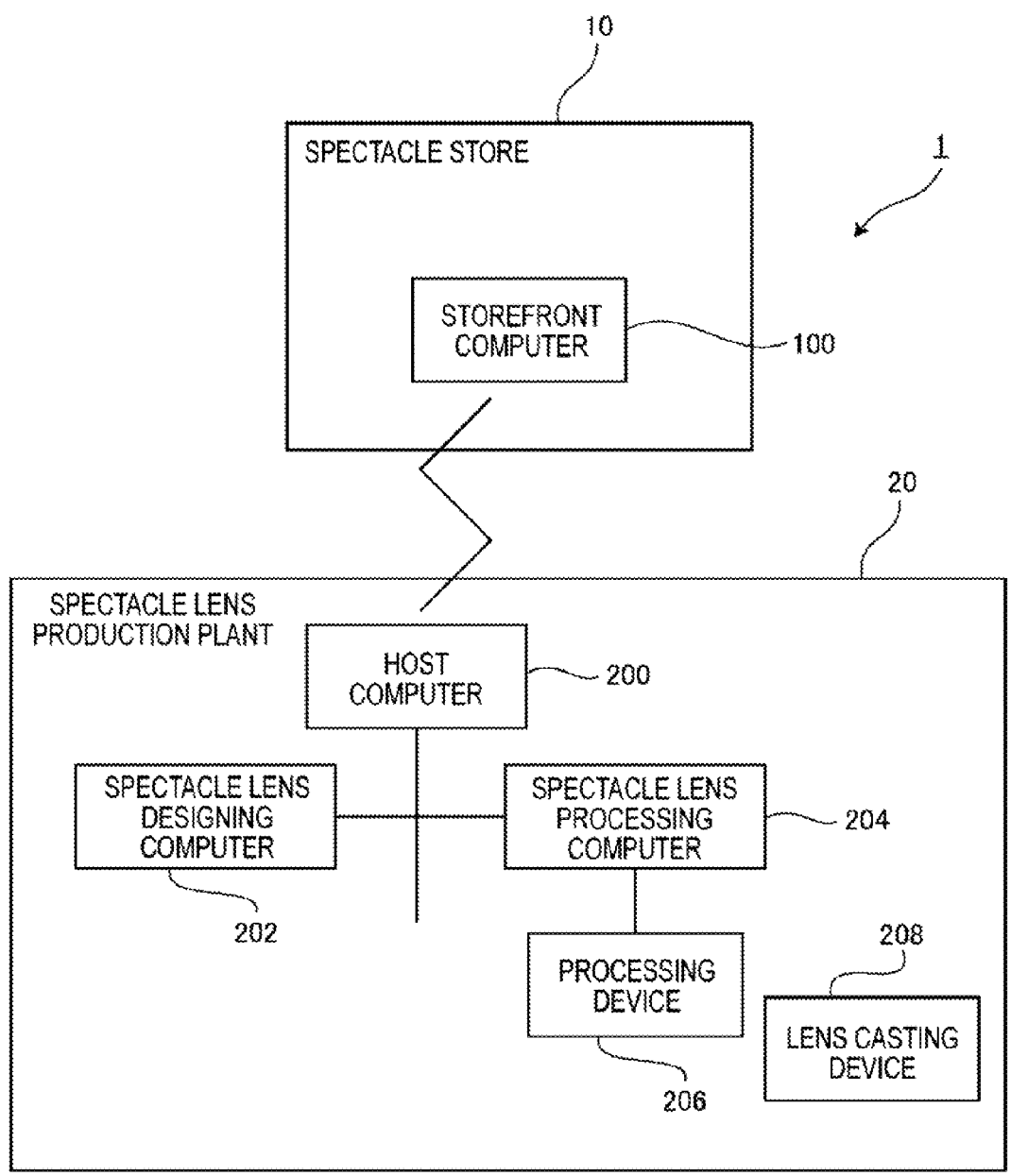
FIG. 1 is a block diagram illustrating a configuration of a production system of spectacle lenses of an embodiment of the present invention.

FIG. 1 is a block diagram illustrating a configuration of a production system of spectacle lenses 1 of the present embodiment. As illustrated in FIG. 1, the production system of spectacle lenses 1 includes a spectacle store 10 which places an order for a spectacle lens corresponding to a prescription for a customer (future spectacle wearer or subject) and a spectacle lens production plant 20 which produces the spectacle lens upon receiving the order from the spectacle store 10. Placing an order to the spectacle lens production plant 20 is performed via a predetermined network such as the Internet or by data transmission such as by facsimile. The orderers may include ophthalmologists and general consumers.

[Spectacle Store 10]

A storefront computer 100 is installed at the spectacle store 10. The storefront computer 100 is, for example, a general personal computer (PC) and is installed with software for placing an order for a spectacle lens to the spectacle lens production plant 20. Lens data or frame data is input to the storefront computer 100 through operation of a mouse, keyboard, or the like by a spectacle store clerk.

The lens data includes, for example, prescribed values (spherical refractive power, astigmatic refractive power, astigmatic axial direction, prism refractive power, prism base bottom direction, addition power, pupillary distance (PD), etc.), lens material, refractive index, type of optical design (variation), outer diameter of the lens, lens thickness, edge thickness, eccentricity, base curve, use conditions of the spectacle lens (distance between cornea vertexes, forward inclination angle, camber angle of a frame), type of the spectacle lens (monofocal and spherical, monofocal and aspherical, multifocal (bifocal, progressive), coating (dyeing processing, hard coat, anti-reflection film, ultraviolet rays cut, etc.), and layout data corresponding to a customer's request.

The frame data include data on a frame shape selected by the customer. The frame data is, for example, controlled by a bar code tag and may be acquired by a bar code reader reading the bar code tag attached to the frame. The storefront computer 100 transmits order data (lens data and frame data) to the spectacle lens production plant 20 via, for example, the Internet.

[Spectacle Lens Production Plant 20]

In the spectacle lens production plant 20, a local area network (LAN) is configured with a host computer 200 as a center thereof. A number of terminal devices such as a spectacle lens designing computer 202 and a spectacle lens processing computer 204 are connected to the LAN. The spectacle lens designing computer 202 and spectacle lens processing computer 204 are general PCs and are installed with a program for spectacle lens design and a program for spectacle lens processing, respectively. The order data transmitted from the storefront computer 100 via the Internet is input to the host computer 200. The host computer 200 transmits the input order data to the spectacle lens designing computer 202.

[Production of Spectacle Lens in Spectacle Lens Production Plant 20]

Figure 2:
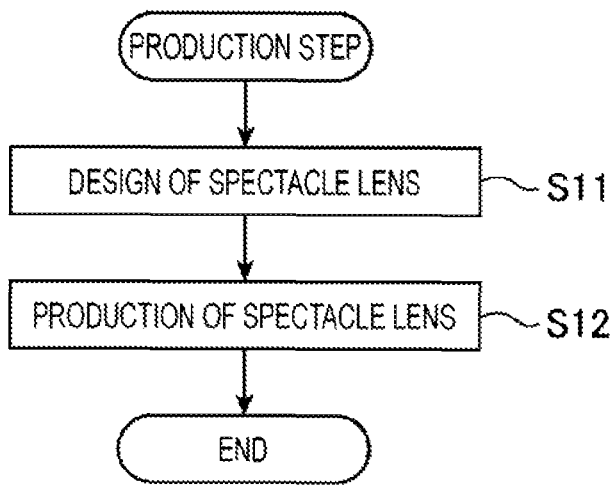
FIG. 2 is a flowchart illustrating a production step of a spectacle lens in a spectacle lens production plant of an embodiment of the present invention.

[S11 (Design of Spectacle Lens) in FIG. 2]

FIG. 2 is a flowchart illustrating a production step of a spectacle lens in the spectacle lens production plant 20. The spectacle lens designing computer 202 is installed with a program for designing a spectacle lens corresponding to the order and thus generates lens design data based on the order data (lens data) and lens shape processing data based or the order data (frame data). Designing of the spectacle lens by the spectacle lens designing computer 202 will be described in detail later. The spectacle lens designing computer 202 transfers the generated lens design data and lens shape processing data to the spectacle lens processing computer 204.

[S12 (Production of Spectacle Lens) in FIG. 2]

The spectacle lens processing computer 204 reads the lens design data and lens shape processing data transferred from the spectacle lens designing computer 202 and drives and controls a processing device 206.

For example, a case is assumed where a plastic spectacle lens is produced by a cast polymerization method. In this case, for example, the processing device 206 grinds and/or polishes a material such as metal, glass, or ceramic according to the lens design data, thereby producing shaping molds each corresponding to each of an outer surface (convex surface) and an inner surface (concave surface) of the lens. The pair of shaping molds having been produced are then disposed in an opposing manner with a space corresponding to a thickness of the spectacle lens therebetween. An outer periphery surface of the shaping molds is winded with an adhesive tape, thereby sealing the space between the shaping molds. The pair of shaping molds are mounted to a lens casting device 208. A hole is created in a part of the adhesive tape and raw material liquid for lens is injected into the cavity (sealed space between the shaping molds) through this hole. The raw material liquid for lens having been injected to and thereby filling the cavity is polymerized and cured by heat, irradiation with ultraviolet rays, or the like. As a result, a polymer (spectacle lens base material) which the respective transfer surface shapes of the pair of shaping molds and the peripheral shape formed by the adhesive tape are transferred to is obtained. The spectacle lens base material, having been obtained by polymerization and curing is then removed from the shaping molds. The spectacle lens base material having been removed from the mold is subjected to removal of residual stress by annealing treatment and various coatings such as dyeing processing, hard coat processing, anti-reflection film, or ultraviolet rays cutting coating. As a result, the spectacle lens is completed and delivered to the spectacle store 10.

Moreover, in the spectacle lens production plant 20, powers in an entire range of production may be classified into a plurality of groups and, groups of semi-finished lens blanks having a convex surface curve shape (e.g. spherical shape or aspherical shape) and a lens diameter conforming to the power ranges of the respective groups may be prepared in advance of an order of the spectacle lens in order to enhance productivity. The semi-finished lens blanks may be, for example, resin blanks or glass blanks with a convex surface of an optical surface (finished surface) and a concave surface of a non-optical surface (unfinished surface). In this case, an optimum semi-finished lens blank is selected based on the lens data. The selected semi-finished lens blank is then amounted to the processing device 206. The processing device 206 grinds and/or polishes a concave surface of the mounted semi-finished lens blank based on the lens design data, thereby producing an uncut lens. The uncut lens after processing of the concave surface shape is then subjected to various coatings such as dyeing processing, hard coat processing, anti-reflection film, or ultraviolet rays cutting coating. The uncut lens applied with the various coatings is then subjected to peripheral processing of the outer periphery surface thereof based on the lens shape processing data generated by the spectacle lens designing computer 202. The spectacle lens having been processed into a lens shape is delivered to the spectacle store 10.

In the present embodiment, a spectacle lens including a region with refractive power progressively changing between two reference points and a spectacle lens including a similar region thereto are designed and produced. The spectacle lenses designed and produced in the present embodiment include a plurality of types corresponding to a usage such as a distance-near vision lens having progressive refractive power, intermediate-near vision lens, and near vision lens. Also included is a plurality of design types with a progressive refractive factor. The design types with a progressive refractive factor include, for example, a one-sided aspherical type where a progressive refractive factor is imparted to a convex surface (object-side surface) or a concave surface (eyeball-side surface), a both-sided progressive type where the progressive refractive factor is imparted to both of the convex surface and concave surface, and a both-sided composite type where the progressive refractive factor in the vertical direction is imparted to the convex surface while the progressive refractive factor in the horizontal direction is imparted to the concave surface.

The distance-near vision lens having progressive refractive power covers a wide distance range from a far distance to near distance and basically has a design focused on distance vision. The intermediate-near vision lens is designed with more focus on intermediate vision than the distance-near vision lens having progressive refractive power and covers an overall indoor distance such as for PC operation and other desk works, house work, etc. The near vision lens is designed exclusively for near vision and covers a distance, for example, from hands to a working desk such as for PC operation and other desk works.

In the present embodiment, a region with refractive power progressively changing between two reference points is defined as the "progressive region." A length along the meridian between a starting point of the progressive region (one reference point) and an ending point (the other reference point) is defined as the "progressive region length." Note that there is no clear definition of the progressive region length (the starting point and ending point of the progressive region). The definition may slightly differ depending on a design concept of a lens manufacturer. For example, take an example of the progressive region length in the distance-near vision lens having progressive refractive power. According to one definition, the progressive region length is a length along the meridian between the lowermost edge of a distance power measurement circle (where the center of the distance power measurement circle is a control point for the distance power) by a lens meter and the uppermost edge of a near power measurement circle (where the center of the near power measurement circle is a control point for the near power) by the lens meter. According to another definition, the progressive region length is a length along the meridian between the lowermost edge of a distance portion and the uppermost edge of a near portion. According to yet another definition, the progressive region length is a length along the meridian from a distant eye point to a position where 85% of an addition power is added.

In this manner, the progressive region length has the multiple types of definitions. However, a difference in the progressive region length according to the respective definitions is extremely small. According to any definition, the progressive region length of the distance-near vision lens having progressive refractive power is within a range of 8 to 22 mm and the progressive region length of the intermediate-near vision lens is within the range of 20 to 25 mm. Note that the above ranges of the progressive regions lengths are values described in "Glasses Science Handbook" (edited by Glasses Science Handbook Editing Committee in the Japanese Society of Glasses Science, published by Gankyo Publishing Co., Ltd. on Mar. 30, 2012, 3rd Ed., p 137, Table 4-1 "Classification of progressive lens"). The intermediate-near vision lens is basically designed to have a longer progressive region length than the distance-near vision lens having progressive refractive power with gentler changes in the refractive power in the progressive region and thus has a wider area of clear vision in the progressive region.

[Specific Designing Method of the Spectacle Lens by the Spectacle Lens Designing Computer 202]

Two examples of designing method (first example and second example) for an intermediate-near vision lens with a progressive region length of 18 mm will be described below. A spectacle lens of the first example is a type of intermediate-near vision lens with more focus on intermediate vision while the second example is a type of intermediate-near vision lens with more focus on distance vision. According to the present designing method, the intermediate-near vision lens can be designed to have a short progressive region length down to 18 mm, which has been covered by distance-near vision lens having progressive refractive power, while reduction in a width of the area of clear vision in the progressive region due to shortened progressive region length can be suppressed. For example, even though the progressive region length is shortened, the width of the area of clear vision equivalent to that the existing intermediate-near vision lens (for example, those having a progressive region length of 20 mm or 23.5 mm) can be ensured. A section, where an equivalent width of the area of clear vision is ensured (equivalent intermediate vision performances) among the progressive regions of spectacle lenses having different progressive region lengths, is hereinafter defined as an "intermediate vision region." This reduces warping or shakes of images due to aberration in the intermediate vision region (especially in a side part of the intermediate vision region) and thus ensures superior performance for indoor use where intermediate vision and near vision are mainly used.

Figure 3:
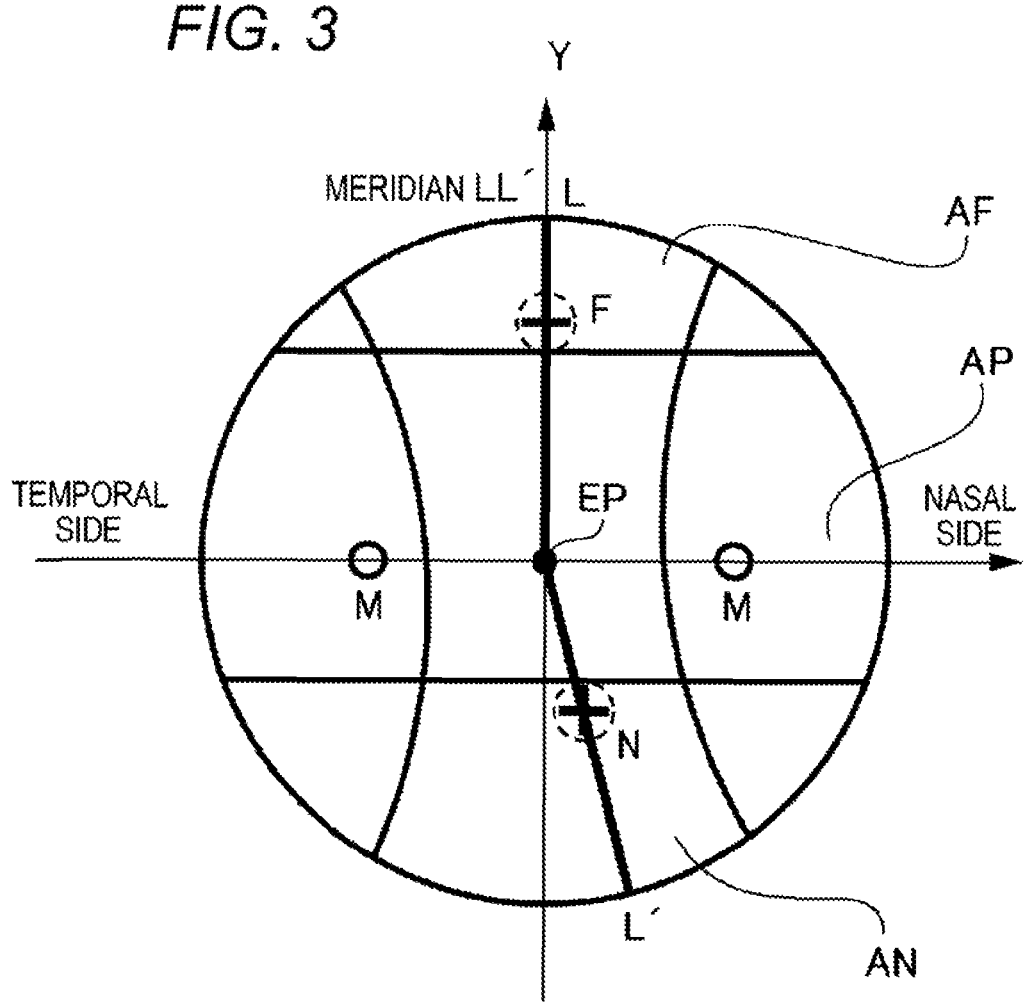
FIG. 3 is a diagram illustrating a layout model of an intermediate-near vision lens designed and produced according to an embodiment of the present invention.

FIG. 3 is a diagram illustrating a layout model of an intermediate-near vision lens designed according to the present designing method. As illustrated in FIG. 3, the intermediate-near vision lens includes a distance portion AF, a near portion AN, and a progressive region AP. The distance portion AF is arranged in an upper side of the lens and the near portion AN is arranged in a lower side of the lens. The progressive region AP is arranged between the distance portion AF and the near portion AN. In the progressive region AP, the refractive power progressively changes from the distance portion AF to the near portion AN. In the example of FIG. 3, the progressive region length (the length of the progressive region AP) is a length along the meridian LL' between the lowermost edge of a distance power measurement circle (where the center of the distance power measurement circle is a control point for the distance power) by a lens meter and the uppermost edge of a near power measurement circle (where the center of the near power measurement circle is a control point for the near power) by the lens meter. An eye point EP is arranged in the geometrical center (or prism measurement point) of the lens, where several percent of the addition power is added. Note that, in a layout model of the distance-near vision lens having progressive refractive power, the distance portion AF is wider and the progressive region length is shorter as compared to the intermediate-near vision lens. Further, the eye point EP is arranged at a predetermined distance from the geometrical center of the lens in the upper direction therefrom.

Figure 4:
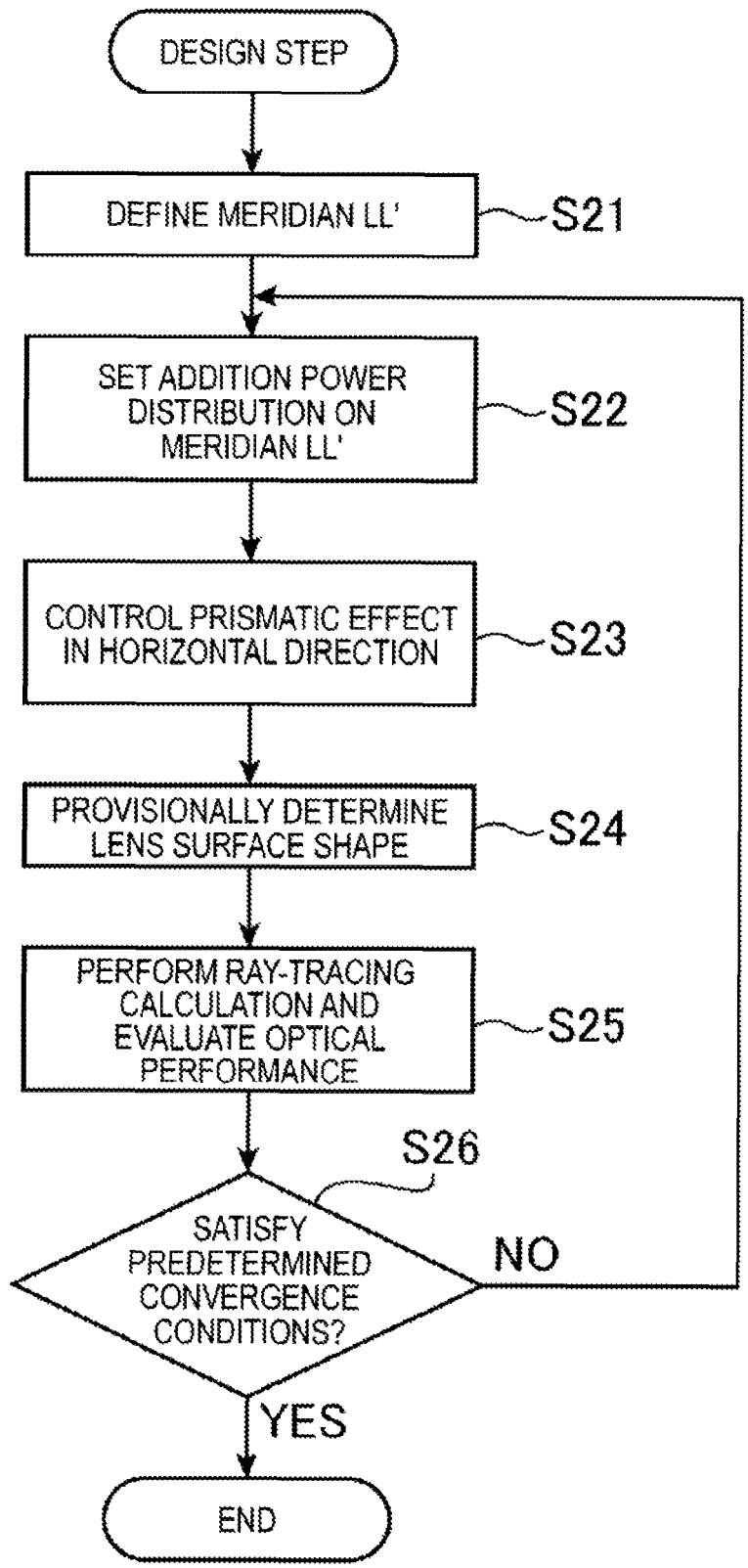
FIG. 4 is a flowchart illustrating a design step of a spectacle lens by a spectacle lens designing computer of a first example of the present invention.

FIG. 4 is a flowchart illustrating a design step of the spectacle lens by the spectacle lens designing computer 202.

FIRST EXAMPLE

[S21 (Defining Meridian LL') in FIG. 4]

The spectacle lens designing computer 202 set an eye point EP that functions as a wearing reference based on the order data (layout data). Note that respective positions required for the lens layout such as the eye point EP (e.g. distance power measurement point F or near power measurement point N) are specified based on a pair of hidden marks N directly engraved on the lens surface based on the order data (layout data).

The spectacle lens designing computer 202 calculates an amount of inset of the near portion AN to the distance portion AF based on a predetermined parameter in the order data having been received from the storefront computer 100 via the host computer 200. The parameter used for the calculation of the amount of inset includes a near power, a distance power, and use conditions such as a base curve (BC), pupillary distance (PD), distance between cornea vertexes, forward inclination angle, camber angle of a frame, etc.

The spectacle lens designing computer 202 defines the meridian LL' based on the eye point EP and amount of inset.

As illustrated in FIG. 3, the meridian LL' is defined as a line that extends in a vertical direction from an upper edge of the lens to the geometrical center of the lens (eye point EP), from where the line is inclined to a nasal side toward a lower edge of the lens considering convergence of the eye. The distance power measurement point F (the center of distance power measurement circle) and the near power measurement point N (the center of near power measurement circle) are arranged on the meridian LL'. The length along the meridian LL' between the lowermost edge of the distance power measurement circle and the uppermost edge of the near power measurement circle is 18 mm.

[S22 (Setting Addition Power Distribution on Meridian LL') in FIG. 4]

The spectacle lens designing computer 202 sets an addition power distribution on the meridian LL' based on the predetermined parameter in the order data. The parameter used for setting the addition power distribution on the meridian LL' includes the near power, distance power, addition power, and the length of the progressive region AP.

The addition power distribution can be obtained by, for example, disposing control points at equal intervals in a section on the meridian LL', calculating refractive power at the respective control points such that the refractive power changes at a certain progressive ratio (the normalized addition refractive power distribution (normalized addition refractive power distribution) gradually increases at a certain rate, in other words, a differential value of the normalized addition refractive power distribution increases at a certain rate), and interpolating the refractive power at adjacent control points by using spline interpolation or the like such as B-spline. In such a design (hereinafter referred to as "existing design"), however, a problem, that a width of the area of clear vision in the progressive region AP becomes smaller when the progressive region length is designed to be shorter, cannot be avoided.

There fore, the spectacle lens designing computer 202 controls the maximum value where the normalized addition refractive power distribution in the progressive region AP is differentiated when setting the addition power distribution in order to avoid the above problem. Details for setting the addition power distribution will be described later.

[S23 (Controlling Prismatic Effect in Horizontal Direction) in FIG. 4]

The spectacle lens designing computer 202 defines a plurality of cross-sectional curves extending in the horizontal direction from the meridian LL' and sets refractive power distributions on the respective cross-sectional curves corresponding to power distributions of the respective regions of the distance portion AF, near portion AN, and progressive region AP. Here, a problem that distortion aberration becomes larger in the horizontal direction if refractive power distributions are simply set without considering differences in the power distributions of the respective regions. Therefore, the refractive power distribution is set such that prismatic effect is suppressed (controlled) at a certain distance apart in left and right from the meridian where no inset is considered (in the meridian shape in FIG. 3, a line parallel to 7 axis).

[S24 (Provisional Determination of Lens Surface Shape) in FIG. 4]

The spectacle lens designing computer 202 connects and smooths the refractive power distributors on the meridian LL' and on the respective cross-sectional curves extending in the horizontal direction using spline interpolation or the like, converts the connected refractive power distributions into a curvature distribution with a known conversion formula, and thereby provisionally determines a geometric shape of the lens surface.

[S25 (Ray-Tracing Calculation) in FIG. 4]

The spectacle lens designing computer 202 performs ray-tracing calculation on the lens having been provisionally determined in the processing step 324 (provisional determination of lens surface shape) in FIG. 4 and evaluates optical performance of the lens.

[(S26 (Determination on Convergence Conditions) in FIG. 4]

The spectacle lens designing computer 202 determines whether predetermined convergence conditions are satisfied based on the evaluation result in the processing step 325 ray-tracing calculation) in FIG. 4. The predetermined convergence conditions include, for example, "that the maximum value where the normalized addition refractive power distribution in the progressive region AP is differentiated is less than or equal to a predetermined value."

When the predetermined convergence conditions are not satisfied (No in S26 in FIG. 4), the spectacle lens designing computer 202 returns to the processing step S22 in FIG. 4 (setting addition power distribution on meridian LL') and performs minor adjustment of the addition power distribution, and then executes the processing step S23 (controlling prismatic effect in horizontal direction) in FIG. 4 and the subsequent steps for the second time. When the predetermined convergence conditions are satisfied (Yes in 326 in FIG. 4), the spectacle lens designing computer 202 calculates an aspherical compensation amount corresponding to use conditions (e.g. distance between cornea vertexes, forward inclination angle, camber angle of a frame, etc.) for the lens surface shape having been provisionally determined in the processing step S24 (provisional determination of lens surface shape) in FIG. 4 and adds the compensation amount to the lens. As a result, the lens surface shape is determined and thus designing of the shape of intermediate-near vision lens is completed.

Data on the determined shape of the intermediate-near vision lens (lens design data) is transferred to the spectacle lens processing computer 204. The spectacle lens processing computer 204, as described above, drives and controls the processing device 206 according to the lens design data to perform processing of a block piece, thereby producing the intermediate-near vision lens. In the present processing step, engraving of the hidden marks M is also performed.

[Setting of Addition Power Distribution in the First Example and Comparison with Addition Power Distribution of Existing Design]

Figure 5A:
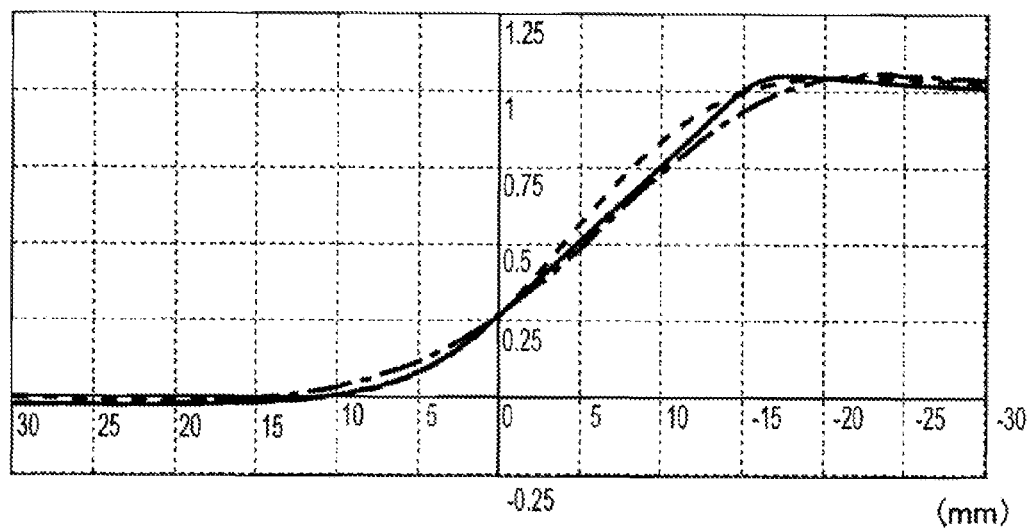
FIG. 5 includes diagrams illustrating normalized addition refractive power distributions (FIG. 5A) and first order differential values of the normalized addition refractive power distributions (FIG. 5B) of respective examples.
Figure 5B:
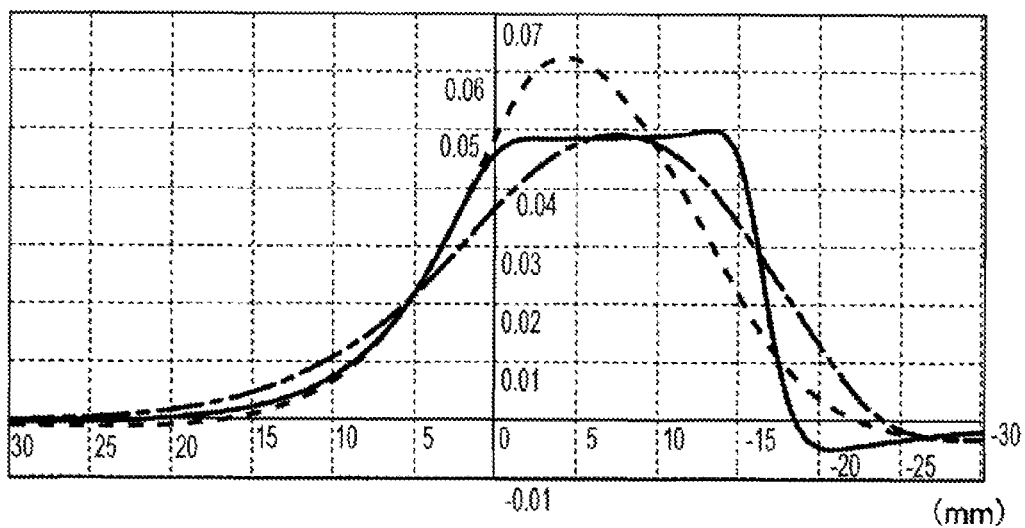

FIG. 5A is a graph illustrating a normalized addition refractive power distribution and FIG. 5B is a graph illustrating a first order differential value of the normalized addition refractive power distribution. In FIG. 5A, the vertical axis shows the refractive power (unit: D) added to the progressive region AP while the horizontal axis shows a position on the meridian LL' (unit: mm). In FIG. 5B, the vertical axis shows the first order differential value of the normalized addition refractive power distribution added to the progressive region AP while the horizontal axis shows a position on the meridian LL' (unit: mm). A position at 0 mm on the horizontal axis shows the eye point. The first order differential value of the normalized addition refractive power distribution is hereinafter referred to as "addition refractive power change ratio" for convenience. In FIGS. 5A and 5B, an alternate long and short dashed line shows characteristic of an intermediate-near vision lens of a first existing design example with a progressive region length of 23.5 mm and a dotted line shows characteristics of an intermediate-near vision lens of a second existing design example with a progressive region length of 18 mm while a solid line shows characteristics of the intermediate-near vision lens of the present first example with a progressive region length of 18 mm. The near power, distance power, and addition power are in common in the respective examples of the first and second existing design examples and the first example of the present invention. That is, the first existing design example (23.5 mm), the second existing design example (18 mm), and the first example (18 mm: intermediate vision prioritized) belong to a series of spectacle lenses where each of the near power, distance power, and addition power is in common respectively.

As illustrated in FIG. 5B, in the first existing design example (23.5 m) and the second existing design example (18 mm), the addition refractive power change ratio has characteristics to gradually increase and reach a peak, from where the ratio gradually decreases toward the near portion AN (characteristics of forming a bell-shaped curve). The second existing design example has a larger maximum value of the addition refractive power change ratio than that of the first existing design example since there is a need to add the same addition power as the first existing design example within a progressive region length shorter than that of the first existing design example. That is, in the second existing design example, the refractive power is added at a steeper gradient as compared to the first existing design example.

FIGS. 6A, 6B, and 6C illustrate RMS distributions of the first existing design example (23.5 mm), the second existing design example (18 mm), and the first example (18 mm: intermediate vision prioritized), respectively. The RMS distribution is a distribution of square root values, of the sum of a squared difference between an average power error and an adjustment power, and a squared quotient of astigmatism divided by two, multiplied by a predetermined coefficient. Note that, in respective aberration distribution diagrams in FIG. 6 and the subsequent drawings, an inset is not considered for convenience. As apparent from comparison between FIGS. 6A and 6B, the second existing design example has a narrower width of the area of clear vision in a progressive region AP as a side effect of a steeper gradient of refractive power change as compared to the first existing design example.

On the other hand, as illustrated in FIG. 5B, in the first example (18 mm: intermediate vision prioritized), the addition refractive power change ratio has characteristics to gradually increase and becomes constant upon reaching a point giving the same value as that of the peak in the first existing design example (23.5 mm) (maximum value of the addition refractive power change ratio in the first existing design example), from where the ratio gradually decreases toward the near portion AN (characteristics of forming a curve with a flat top).

In this manner, the first example (18 mm: intermediate vision prioritized) is designed to have a maximum value of addition refractive power change ratio closer to the peak in the first existing design example (23.5 mm) as compared to the second existing design example (18 mm). More specifically, in the first example, the addition refractive power change ratio is designed to be lower than or equal to the peak in the first existing design example at least in a partial section (for example over the entire area) in the progressive region AP and a difference from the peak is within a predetermined range. Here, the predetermined range is given by, for example, the following formula:

$$P\_design - P\_base < 0.005 [Diopter/mm],$$

where the maximum value of addition refractive power charge ratio in the first example is defined as P_design and the maximum value of addition refractive power change ratio in the first existing design example is defined as P_base. Furthermore, the first example is allowed to have a wider region having the same value as that of the peak in the first existing design example (refer to FIG. 5B) such that an area given by the distribution of addition refractive power change ratios of the first existing design example is equal to an area given by the distribution of addition refractive power change ratios of the first example, thereby adding the same addition power as the first existing design example within the progressive region length shorter than that of the first existing design example.

In the first example (18 mm: intermediate vision prioritized), the maximum value of addition refractive power change ratio is suppressed to the same value as in the first existing design example (23.5 mm). Therefore, as apparent from comparison between FIGS. 6A and 6C, although the progressive region length is shortened, an equivalent width of the area of clear vision to the first existing design example is ensured (an equivalent width of the area of clear vision to the first existing design example especially in the intermediate vision region). Further, in the first example, the maximum value of addition refractive power change ratio is caused to be closer to the peak in the first existing design example (here, equal to or less than the peak). As a result, as illustrated in FIG. 5A, characteristics of the normalized addition refractive power distribution is more similar to that of the first existing design example as compared to that of the second existing design example (18 mm). Especially in a partial section including the eye point EP, the characteristics is identical or close to that of the first existing design example. From above, in the first example, an equivalent intermediate vision performance to that of the first existing design example is achieved (an equivalent intermediate vision performance to that of the first existing design example especially in the intermediate vision region). Moreover, in the first example, even if the maximum value of addition refractive power change ratio is not less than or equal to the peak in the first existing design example, if the maximum value is suppressed to, for example, less than the peak in the second existing design example, more preferable intermediate vision performance than that of the second existing design example can be obtained.

In the above, the designing method for achieving an equivalent intermediate vision performance (an equivalent intermediate vision performance to that of the first existing design example especially in the intermediate vision region) to that of the first existing design example (23.5 mm) in the first example (18 mm: intermediate vision prioritized) is described. However, the present invention also includes designing, for example, such that a lens with a progressive region length of 23.5 mm achieves an equivalent intermediate vision performance to that of a lens with a longer progressive region length (e.g. 25 mm) (an equivalent intermediate vision performance to that of a progressive region length of 25 mm especially in the intermediate vision region).

In the above, the spectacle lens with a longest progressive region length (first existing design example (23.5 mm)) is employed as a target (reference spectacle lens) from among spectacle lenses belonging to the series of spectacle lenses. To provide complementary description, from among the spectacle lenses belonging to the series of spectacle lenses, any spectacle lens having a progressive region length longer than the designed spectacle lens the first example (18 mm: intermediate vision prioritized) in the above) can be employed as the reference spectacle lens. As an example, a case is assumed where there are four types of spectacle lenses belonging to a series of spectacle lenses and the spectacle lens having the shortest progressive region length of all is the designed spectacle lens. In this case, any type (of the three types) having the progressive region length longer than the designed spectacle lens may be employed as the reference spectacle lens.

SECOND EXAMPLE

[Setting of Addition Power Distribution in the Second Example]

An intermediate-near vision lens of the present second example is also designed according to a flowchart illustrated in FIG. 4. Note that, the intermediate-near vision lens of the second example is a type of intermediate-near vision lens with more focus on instance vision unlike the intermediate-near vision lens of the first example and thus a method of setting the addition power distribution is different from that of the first example. Here, the method of setting the addition power distribution in the second example will be described while descriptions overlapping with the first example are simplified or omitted as appropriate.

Figure 7A:
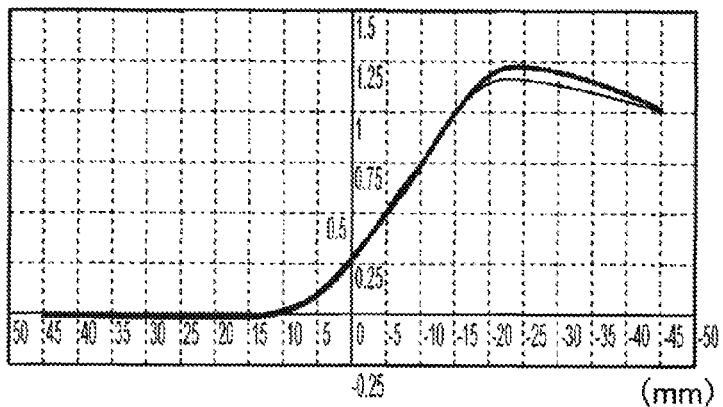
FIG. 7 includes diagrams illustrating normalized addition refractive power distributions (FIG. 7A) and first order differential values of the normalized addition refractive power distributions (FIGS. 7B and 7C) of the respective examples.
Figure 7B:
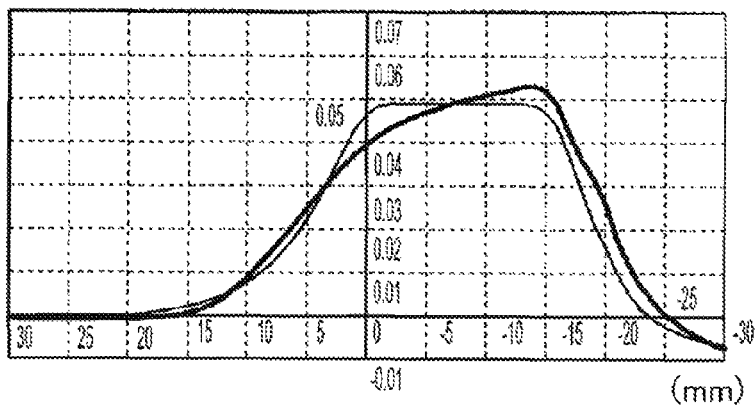
Figure 7C:
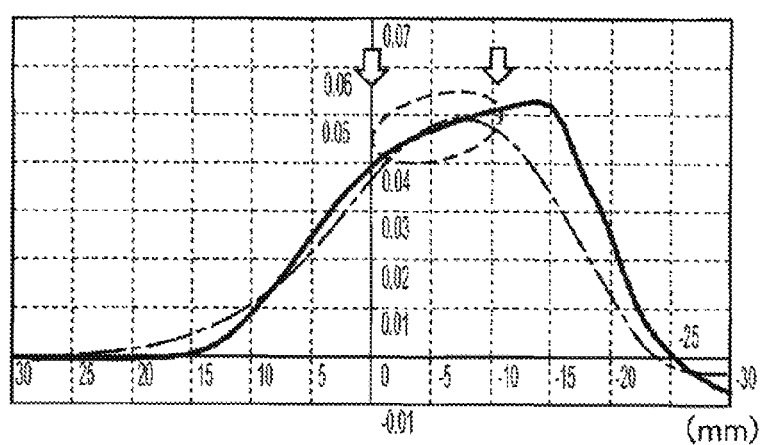

FIG. 7A is a graph illustrating a normalized addition refractive power distribution and FIGS. 7B and 7C are graphs illustrating an addition refractive power change ratio. In FIGS. 7A and 7B, a thin solid line shows characteristics of the intermediate-near vision lens of the first example (18 mm: intermediate vision prioritized) while a bold solid line shows characteristics of the intermediate-near vision lens of the present second example with a progressive region length of 18 Mm. In FIG. 7C, an alternate long and short dashed line shows characteristics of the intermediate-near vision lens of the first existing design example (23.5 mm) while a bold solid line shows characteristics of the intermediate-near vision lens of the present second example with a progressive region length of 18 mm. The near power, distance power, and addition power are in common in the respective examples of the first example and the second example.

In the second example (18 mm: distance vision prioritized), a section, in the progressive region AP in a side closer to the distance portion AF, corresponding to a visual distance high frequently used is defined as a highly-frequent used section while a section, in a side closer to the near portion AN than the highly-frequent used section, corresponding to a visual distance less frequently used than the visual distance corresponding to the highly-frequent used section is defined as a less-frequent used section. In the second example, a width of the area of clear vision especially in the highly-frequent used section in the progressive region AP is designed to be equivalent to that of the first existing design example (23.5 mm). Therefor, the "highly-frequent used section" can also be referred to as the "intermediate vision region" in the second example. A ratio (length) of the highly-frequent used section in the progressive region AP changes as appropriate according to a prioritized visual distance, refractive power, or the like.

As illustrated in FIG. 7B, the first example (18 mm: intermediate vision prioritized) has characteristics where the addition refractive power change ratio forms a curve with a flat top. Note that characteristics of the first example illustrated in FIGS. 7A and 7B are the same as those of the first example illustrated in FIGS. 5A and 5B, respectively. That is, in FIG. 7B, the first example is designed to have the addition refractive power change ratio lower than or equal to the peak in the first existing design example (23.5 mm) at least in a partial section (for example over the entire area) in the progressive region AP.

Meanwhile, as illustrated in FIG. 7, the second example (18 mm: distance vision prioritized) has characteristics where the addition refractive power change ratio less than or equal to the peak of the first existing design example (23.5 mm) in a region closer to the distance portion AF while the addition refractive power change ratio is greater than the peak of the first existing design example in a region closer to the near portion AN. In this manner, in the second example, the addition refractive power change ratio is weighted in the region closer to the near portion AN while, instead, reduced in the region closer to the distance portion AF. In the second example, therefore, a width of the area of clear vision is wide especially in the highly-frequent used section from among the progressive region AP.

Furthermore in the second example 18 mm: distance vision prioritized), as illustrated in FIG. 7C, a region where the addition refractive power change ratio is weighted is controlled such that an average value of addition refractive power change ratio is substantially the same as that of the first existing design example (23.5 mm) in a partial section in the progressive region AP. The above section corresponds to a section encircled by a broken line in FIG. 7C. The section encircled by the broken line ranges from, for example, a distance vision eye point (here, the geometrical center of the lens) to 11 mm downward therefrom, which is the highly-frequent used section. Designing such that the average value of addition refractive power change ratios in the highly-frequent used section is substantially equivalent to that of the first existing design example allows the width of the area of clear vision especially in the highly-frequent used section in the progressive region AP to be equivalent to that of the first existing design example. Note that, in the second example, the addition refractive power change ratio does not exceed the peak in the second existing design example (1.8 mm) even in the section closer to the near portion AN in order to secure the width of the area of clear vision over the entire area in the progressive region AP.

Figure 8A:
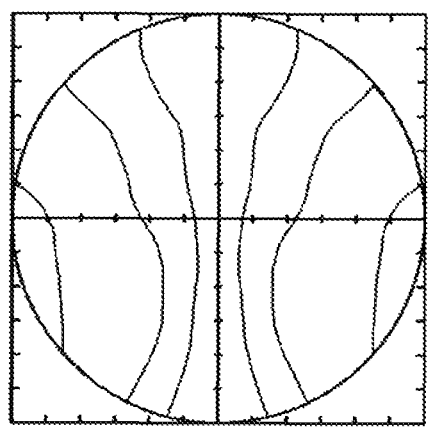
FIG. 8 includes diagrams illustrating RMS distributions of the respective examples.
Figure 8B:
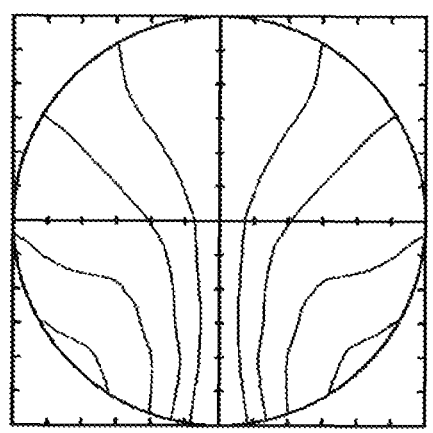

FIGS. 8A and 8B illustrate RMS distributions of the first example (18 mm: intermediate vision prioritized) and the second example (18 mm: distance vision prioritized), respectively. As apparent from comparison between FIG. 8A and FIG. 8B, a width of the area of clear vision is sufficiently ensured over the entire area in the progressive region AP in the first example while in the second example a width of the area of clear vision is ensured over the entire area in the progressive region AP with even wider width especially in the side closer to the distance portion AF.

In the intermediate-near vision lens of the second example (18 mm: distance vision prioritized) having been designed in the above manner, a range, where an equivalent intermediate vision performance to the intermediate-near vision lens of the first existing design example (23.5 mm) is ensured, is dependent on various parameter values and thus changes within a certain range. However, when defining a starting point of the progressive region AP as a position of 0% and an ending point as a position of 100%, generally an equivalent intermediate vision performance to the intermediate-near vision lens of the first existing design example is ensured in a range of, for example, a position of 10% to a position of 90%.

(Exemplary Variations)

Next, exemplary variations will be described. The present variation can be applied to each of the first and second examples. Here, a variation of the first example will be representatively described for convenience.

Figure 9A:
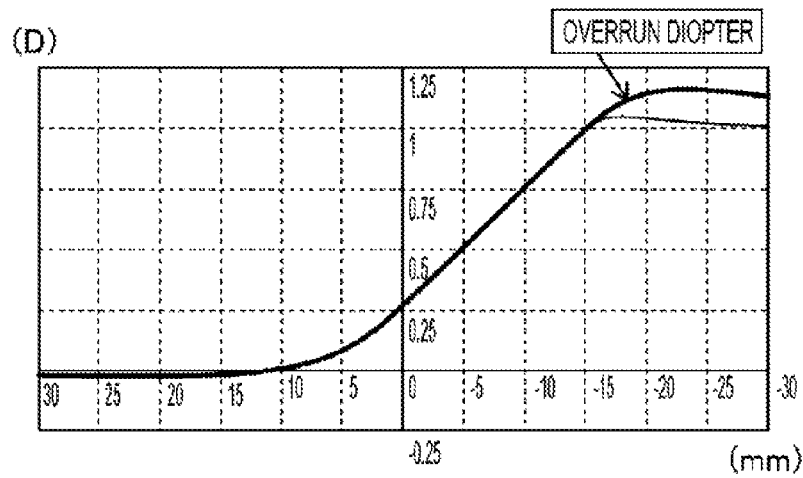
FIG. 9 includes diagrams illustrating normalized addition refractive power distributions (FIG. 9A), first order differential values of the normalized addition refractive power distributions (FIG. 9B), and second order differential values of the normalized addition refractive power distributions (FIG. 9C) of the respective examples.
Figure 9B:
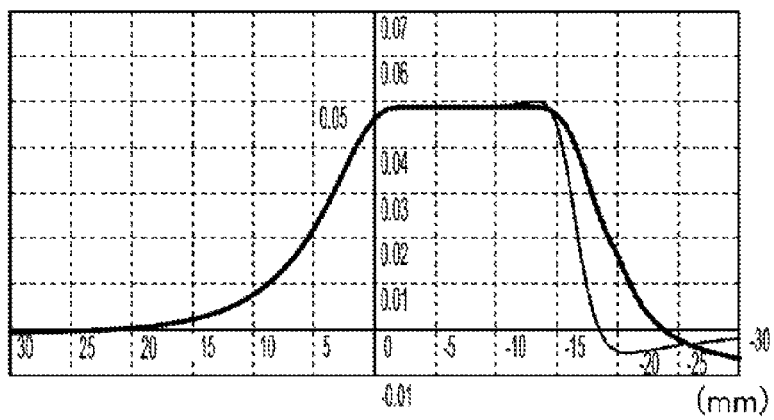
Figure 9C:
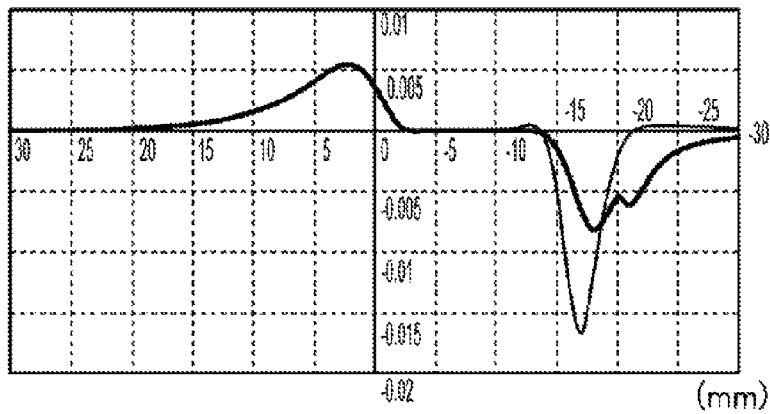

FIG. 9A is a graph illustrating a normalized addition refractive power distribution and FIG. 9B is a graph illustrating an addition refractive power change ratio. FIG. 9C is a graph illustrating a differential value of the addition refractive power change ratio (second order differential value of the normalized addition refractive power distribution. In FIGS. 9A and 9C, a thin solid line shows characteristics of the intermediate-near vision lens of the first example (18 mm: intermediate vision prioritized) while a bold solid line shows characteristics of an intermediate-near vision lens of a variation of the first example (18 mm: intermediate vision prioritized). Furthermore, upper diagrams in FIGS. 10A to 10C illustrate an astigmatism distribution, an average power error distribution, and an RMS distribution of the first example, respectively. Lower diagrams in FIGS. 10A to 10C illustrate an astigmatism distribution, an average power error distribution, and an RMS distribution of a variation of the first example, respectively.

As illustrated in FIG. 9C, the first example (18 mm: intermediate vision prioritized) is caused to have an addition refractive power change ratio less than or equal to the peak in the first existing design example (23.5 nm). As a result, a differential value of the addition refractive power change ratio drastically changes in the side closer to the near portion AN. This illustrates that the addition refractive power change ratio is high in the side closer to the near portion AN. Such a steep variation gradient causes a local variation of aberration and thereby may impair natural wearing feeling (refer to the upper diagrams in FIGS. 10A to 10C).

In the present variation, therefore, a section where the refractive power is progressively added is caused to overrun. Specifically, in the present variation, the refractive power is progressively added to a predetermined range in the near portion AN beyond the ending point of the progressive region AP (uppermost edge of a near power measurement circle) (refer to FIG. 9A). In this manner, causing the section where the refractive power is progressively added to overrun allows for suppressing variations in the differential value of the addition refractive power change ratio in the side closer to the near portion AN (refer to FIG. 9C), thereby allowing the addition refractive power change ratio in the side closer to the near portion AN to be gentle (refer to FIG. 9B). This allows for suppressing the aforementioned local variation of aberration as illustrated in the lower diagrams in FIGS. 10A to 10C.

Note that, in the present variation, an overrun does not include every case where refractive power larger than that at the near power measurement point N is included in the near portion AN. The overrun of the present variation does not substantially decrease when the normalized addition refractive power distribution passes the ending point of the progressive region AP (uppermost edge of the near power measurement circle as illustrated in FIG. 9A and does not substantially decrease until near the ending point of the overrun. The normalized addition refractive power distribution in the overrun region include several variations. The normalized addition refractive power distribution may, for example, continue to linearly rise or continue to curvilinearly rise with variations in the overrun region. Moreover, a flat region may also be included in a part thereof.

The magnitude of refractive power progressively added by the overrun is a value that allows ensuring preferable center vision performance by causing the addition refractive power change ratio in the side closer to the near portion AN to be gentle. Specifically, the magnitude is dependent on various parameter values of a spectacle lens and thus changes within a certain range. Therefore, the present inventors earnestly examined and obtained a finding that a preferable center vision performance is ensured by progressively adding 20 to 30% of the addition power to the range of the overrun.

Figure 11A:
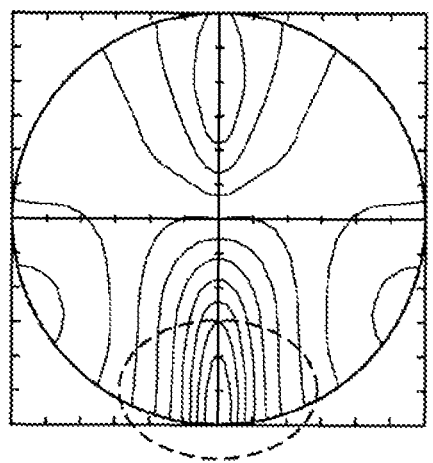
FIG. 11 includes contour diagrams illustrating changes of curvature in the horizontal direction.
Figure 11B:
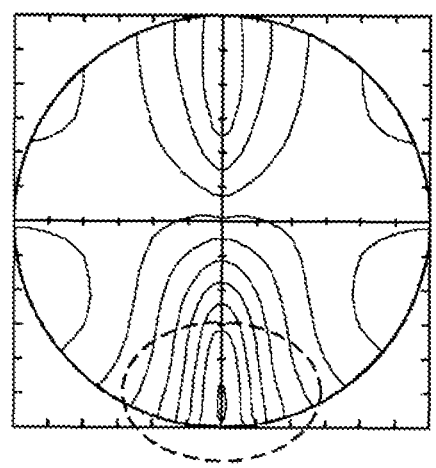

FIG. 11A is a contour diagram illustrating changes of curvature in the horizontal direction when the section where the refractive power is progressively added is caused to overrun. By causing the section where the refractive power is progressively added to overrun, changes of curvature may be concentrated in a lower side of the near portion AN as illustrated in FIG. 11A, thereby resulting in greater warping, shakes, or the like of images in near vision. Therefore, in the present variation, the changes of curvature in the horizontal direction is controlled such that the changes of curvature in the lower side of the near portion AN can be suppressed. FIG. 11 illustrates a result thereof.

Note that, in the present variation, the first example (18 mm: intermediate vision prioritized) and the second example (18 mm: distance vision prioritized) illustrate exemplary designs where the refractive power is progressively added to a predetermined range in the near portion AN beyond the ending point of the progressive region AP (uppermost edge of a near power measurement circle). Alternatively, the reference spectacle lens of the present variation may have the addition refractive power progressively changing only between the starting point and the ending point of the progressive region AP like in the first and second examples.

As above, exemplary embodiment of the present invention have been described. Embodiments of the present invention are not limited thereto but may include various variations within the range of technical ideas of the present invention. For example, combinations where the examples or variations exemplarily and expressly stated herein or apparent examples or variations are combined as appropriate are also included in embodiments of the present application.

The invention claimed is:

1. A spectacle lens comprising:
a first refraction region having first refractive power;
a second refraction region having second refractive power larger than the first refractive power; and
a progressive region having progressively changing refractive power along a meridian from the first refraction region to the second refraction region,
wherein the spectacle lens belongs to a series of spectacle lenses having each of the first refractive power and the second refractive power in common,
a progressive region length, which is a length along a meridian within the progressive region, is shorter than a predetermined reference spectacle lens belonging to the series of spectacle lenses, and
a designed maximum differential value of a normalized addition refractive power distribution in the progressive region of the spectacle lens is approximately equal to a reference maximum differential value of a normalized addition refractive power distribution in the progressive region of the reference spectacle lens.

2. The spectacle lens according to claim 1,
wherein, at least in a partial section in the progressive region of the spectacle lens, the normalized addition refractive power distribution is identical or approximately equal to the normalized addition refractive power distribution of the reference spectacle lens since the designed maximum differential value is designed to be approximately to the reference maximum differential value.

3. The spectacle lens according to claim 1,
wherein, at least in a partial section in the progressive region, a differential value of the normalized addition refractive power distribution in the progressive region is smaller than or equal to the reference maximum differential value.

4. The spectacle lens according to claim 1,
wherein an average value of differential values of the normalized addition refractive power distribution is substantially equal to that of the reference spectacle lens in a predetermined section in the progressive region that is common to that of the reference spectacle lens.

5. The spectacle lens according to claim 4,
wherein, when the progressive region is classified into a highly-frequent used section corresponding to a visual distance high frequently used and a less-frequent used section corresponding to another visual distance less frequently used than the visual distance corresponding to the highly-frequent used section, the predetermined section in the progressive region that is common to that of the reference spectacle lens is the highly-frequent used section.

6. The spectacle lens according to claim 1,
wherein refractive power is progressively added up to a predetermined range beyond a boundary between the progressive region and the second refraction region.

7. The spectacle lens according to claim 6,
wherein the normalized addition refractive power distribution does not decrease when passing the boundary and does not decrease until near an ending point of the predetermined range.

8. The spectacle lens according to claim 6,
wherein a second order differential value of the normalized addition refractive power distribution is suppressed since refractive power is progressively added up to the predetermined range beyond the boundary between the progressive region and the second refraction region.

9. The spectacle lens according to claim 6,
wherein changes of curvature in the horizontal direction in the lens are controlled and thus changes of curvature, in the horizontal direction in the lens due to refractive power progressively added up to the predetermined range beyond the boundary between the progressive region and the second refraction region, are suppressed.

10. A method for producing a spectacle lens, the spectacle lens comprising:
a first refraction region having first refractive power;
a second refraction region having second refractive power larger than the first refractive power; and
a progressive region having progressively changing refractive power along a meridian from the first refraction region to the second refraction region, wherein the spectacle lens belongs to a series of spectacle lenses having each of the first refractive power and the second refractive power in common,
the method comprising the steps of:
setting a progressive region length, which is a length along the meridian within the progressive region, to be shorter than a predetermined reference spectacle lens belonging to the series of spectacle lenses;
designing a designed maximum differential value of a normalized addition refractive power distribution in the progressive region of the spectacle lens to be approximately equal to a reference maximum differential value of a normalized addition reference power distribution in the progressive region of the reference spectacle lens; and producing the spectacle lens having been designed.

11. A method for producing a spectacle lens, the spectacle lens comprising:

a first refraction region having first refractive power;

a second refraction region having second refractive power larger than the first refractive power; and a progressive region having progressively changing refractive power along a meridian from the first refraction region to the second refraction region, the method comprising the steps of:

where, from among a plurality of types of spectacle lens having each of the first refractive power and the second refractive power in common, the spectacle lens having a first progressive region length along the meridian within the progressive region is defined as a reference spectacle lens and the spectacle lens having a second progressive region length shorter than the first progressive region length is defined as a designed spectacle lens, designing a designed maximum differential value of a normalized addition refractive power distribution in the progressive region of the designed spectacle lens to be approximately equal to a reference maximum differential value of a normalized addition refractive power distribution in a progressive region of the reference spectacle lens; and producing the designed spectacle lens having been designed.

12. A spectacle lens comprising:

a first refraction region having first refractive power;

a second refraction region having second refractive power larger than the first refractive power; and a progressive region having progressively changing refractive power along a meridian from the first refraction region to the second refraction region, wherein the spectacle lens belongs to a series of spectacle lenses having each of the first refractive power and the second refractive power in common, a progressive region length, which is a length along the meridian within the progressive region, is shorter than a predetermined reference spectacle lens belonging to the series of spectacle lenses, and an average value of differential values of the normalized addition refractive power distribution of the spectacle lens is approximately equal to that of the reference spectacle lens in a predetermined section in the progressive region that is common to that of the reference spectacle lens.

* * * * *